Figure 1:
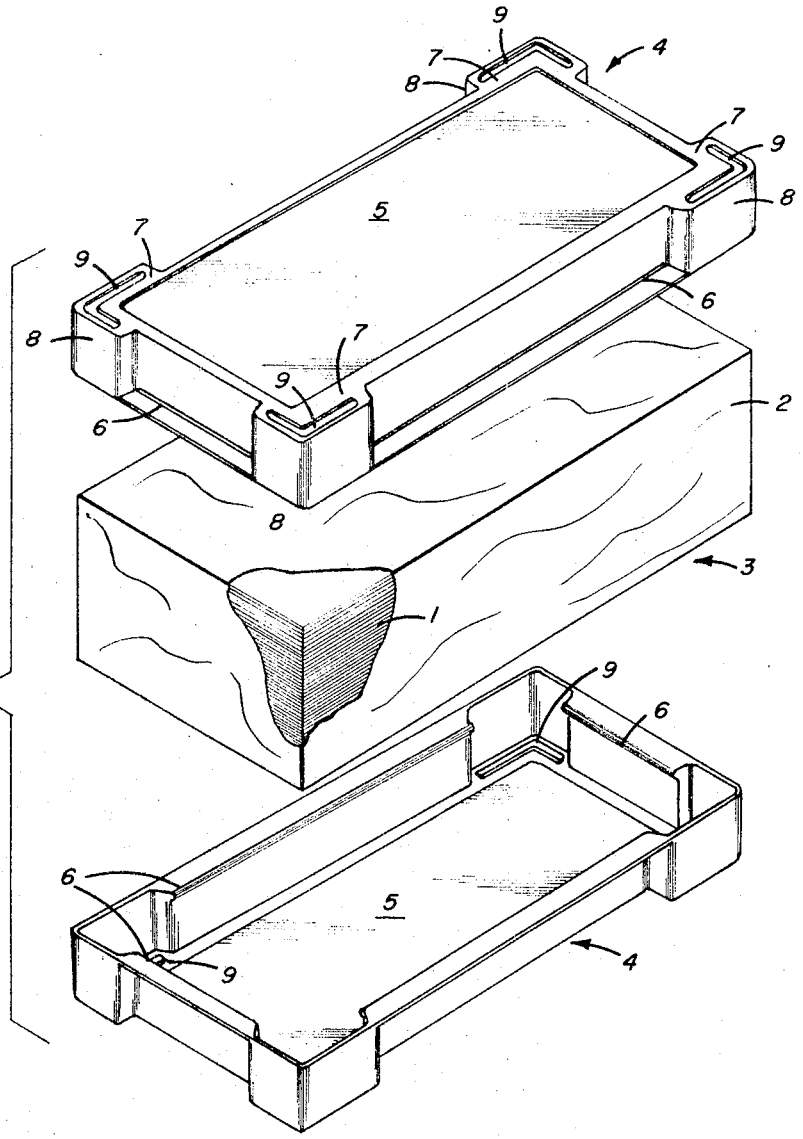
Figure 2:
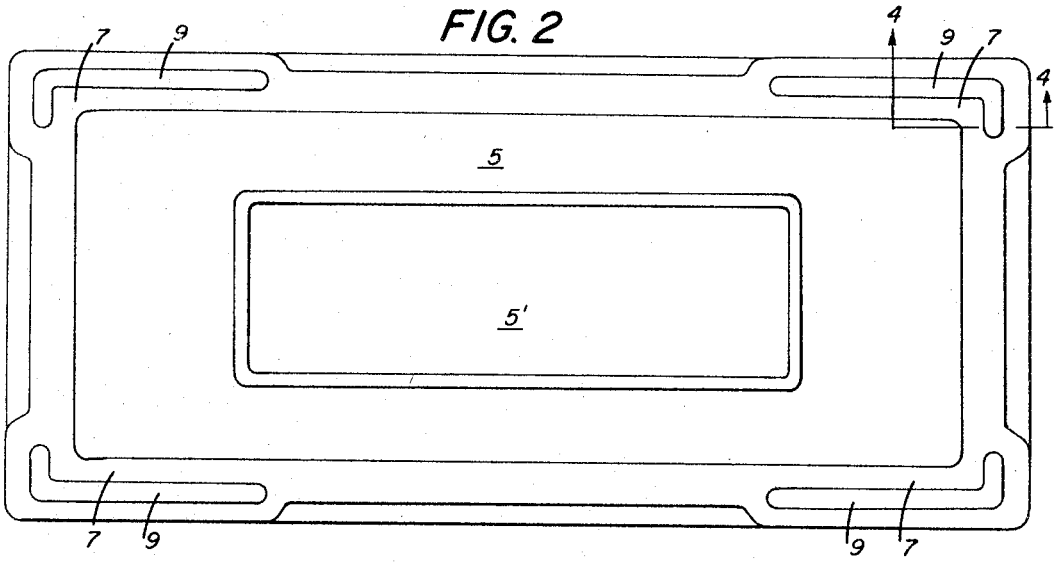
Figure 3:
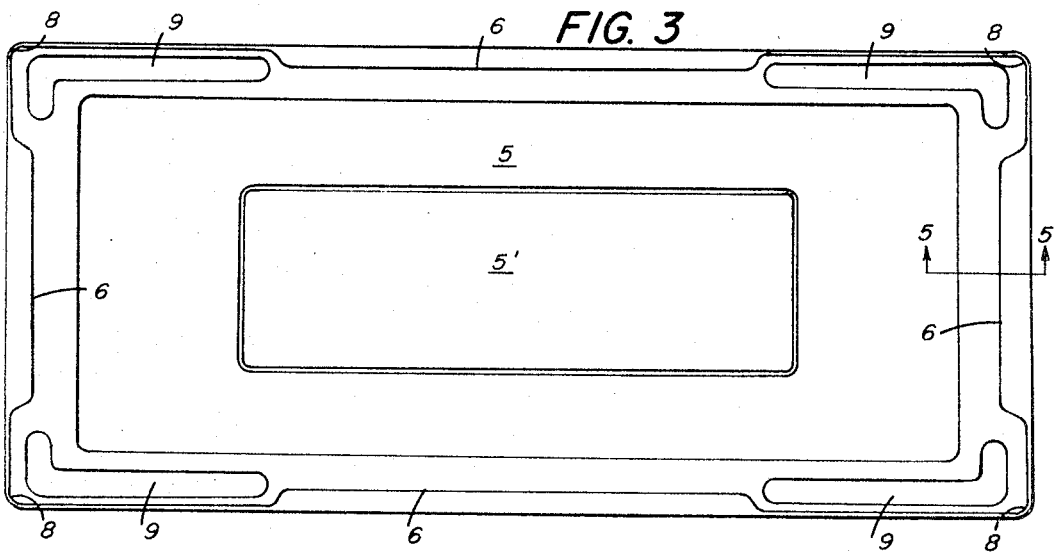
Figure 4:
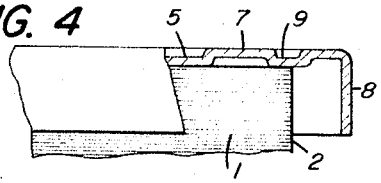
Figure 5:
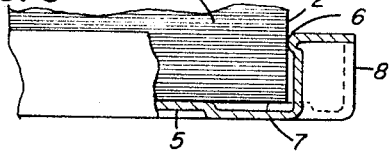

T862024

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MAY 27, 1969

862 O.G. 1011

801,566

PACKAGE AND METHOD

Arthur C. Rissberger, Jr., Webster, and Adrian C. Runions, Rochester, N.Y. (both % 1669 Lake Ave., Rochester, N.Y. 14650)

Filed Feb. 24, 1969. Published May 27, 1969

Int. Cl. B65d *85/30;* B65b *11/00, 51/10*

U.S. Cl. 206—62

2 Sheets Drawing. 9 Pages Specification

A method is disclosed for packaging a plurality of flat articles, e.g., microfiche, tabulating cards, slide transparencies, microfilm cards, enclosed substacks of any of these which form a stack (1). The stack (1) is enclosed with a 1½ mil sheet of polyolefin material (2) which is heat-shrunk around the stack to form a relatively rigid subassembly (3). The shrunk enclosure protects the stack from moisture, dust, and the like. Protective caps (4) are

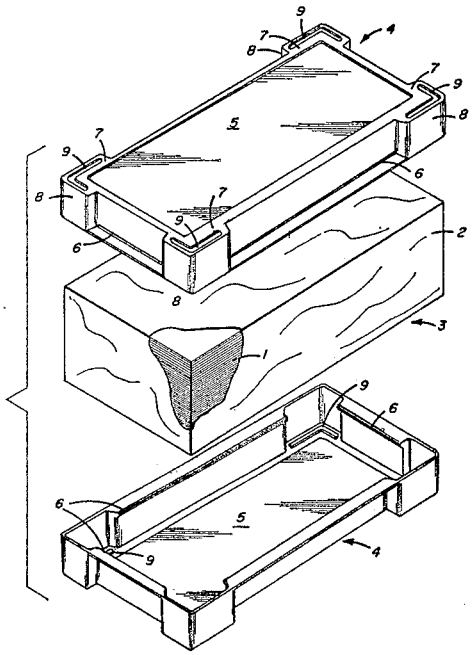

applied to opposite ends of the subassembly (3). The protective caps (4) are vacuum-formed of high-impact polystyrene sheet having a thickness of .025 inch. The caps (4) each include a panel (5) for engaging and protecting the surface of the subassembly (3). Elements (6), extending from the panel (5), grasp the sides and ends of the subassembly to hold the cap (4) in place. Elements, also extending from the panel (5), define walls (7) which overlie the perimeter of the subassembly (3) in spaced relationship with the surface thereof. Likewise, these elements define walls (9) which surround the corners of subassembly (3) in spaced relationship therewith. The walls (7) (8) serve to protect the edges and corners of the subassembly (3) from damage due to impact, abrasion, or the like, which might result from rough handling during shipping and/or storage.

T862024

SN - 801566

May 27, 1969 A. C. RISSBERGER, JR., ET AL DEF. PUB.

PACKAGE AND METHOD

Filed Feb. 24, 1969

Sheet 1 of 2

ADRIAN C. RUNIONS
ARTHUR C. RISSBERGER
INVENTORS

BY Pitrelle, O. Hodgson
William E. Jackson
ATTORNEY & AGENT

ADRIAN C. RUNIONS
ARTHUR C. RISSBERGER
INVENTORS

BY Walter O. Hodsdon
William E. Jackson
ATTORNEY & AGENT